US011987276B2

(12) United States Patent
Tripathy

(10) Patent No.: US 11,987,276 B2
(45) Date of Patent: May 21, 2024

(54) MONITORING SYSTEM FOR AXLES OF A VEHICLE

(71) Applicant: TRANSPORTATION IP HOLDINGS, LLC, Norwalk, CT (US)

(72) Inventor: Janmejay Tripathy, Cedar Rapids, IA (US)

(73) Assignee: IP Transportation Holdings, LLC, Norwalk, CT (US)

( * ) Notice: Subject to any disclaimer, the term of this patent is extended or adjusted under 35 U.S.C. 154(b) by 380 days.

(21) Appl. No.: 17/181,667

(22) Filed: Feb. 22, 2021

(65) Prior Publication Data

US 2022/0266883 A1 Aug. 25, 2022

(51) Int. Cl.

| | |
|---|---|
| ***B61L 27/20*** | (2022.01) |
| ***B61K 9/04*** | (2006.01) |
| ***B61L 27/04*** | (2006.01) |
| ***B61L 27/57*** | (2022.01) |
| ***B61L 27/70*** | (2022.01) |
| ***G07C 5/02*** | (2006.01) |

(52) U.S. Cl.

CPC ................ *B61L 27/20* (2022.01); *B61K 9/04* (2013.01); *B61L 27/04* (2013.01); *B61L 27/57* (2022.01); *B61L 27/70* (2022.01); *G07C 5/02* (2013.01); *B61L 2201/00* (2013.01); *B61L 2205/00* (2013.01)

(58) Field of Classification Search

CPC ........................................................ B61K 9/04

See application file for complete search history.

(56) References Cited

U.S. PATENT DOCUMENTS

| | | | | |
|---|---|---|---|---|
| 2012/0150370 A1* | 6/2012 | Oldknow | B61K 3/00 | 701/19 |
| 2015/0200712 A1* | 7/2015 | Cooper | H04L 12/40169 | 375/257 |
| 2015/0217790 A1* | 8/2015 | Golden | B60T 17/228 | 701/19 |
| 2016/0159381 A1* | 6/2016 | Fahmy | B61K 9/10 | 701/19 |
| 2016/0176425 A1* | 6/2016 | Traylor | B61L 15/0027 | 701/19 |
| 2016/0359741 A1* | 12/2016 | Cooper | H04W 4/44 | |
| 2017/0089446 A1* | 3/2017 | Worden | G01M 17/10 | |
| 2017/0313332 A1* | 11/2017 | Paget | B61L 25/025 | |
| 2019/0176862 A1* | 6/2019 | Kumar | B61L 15/0027 | |

(Continued)

OTHER PUBLICATIONS

T. Pflanzner, A. Kertesz, A Taxonomy and Survey of IoT Cloud Applications, doi:10.4108/eai.6-4-2018.154391 (2018) (Year: 2018).*

*Primary Examiner* — Peter D Nolan
*Assistant Examiner* — Michael F Whalen
(74) *Attorney, Agent, or Firm* — K&L Gates LLP

(57) ABSTRACT

A monitoring system is provided that may include a sensor configured to detect at least one characteristic related to at least one axle of a first vehicle. The monitoring system may also include a controller having one or more processors in communication with the sensor. The one or more processors may be configured to restrict movement of the first vehicle based at least in part on the at least one characteristic related to the at least one vehicle axle, and vary movement of a second vehicle based at least in part on the at least one characteristic related to the at least one vehicle axle.

7 Claims, 6 Drawing Sheets

(56) References Cited

U.S. PATENT DOCUMENTS

| | | | | |
|---|---|---|---|---|
| 2019/0265131 | A1* | 8/2019 | Worden | G07C 5/0808 |
| 2019/0391049 | A1* | 12/2019 | Jones | B61L 15/0081 |
| 2020/0062121 | A1* | 2/2020 | Sato | B61K 9/04 |
| 2021/0134081 | A1* | 5/2021 | Claussen | B61L 27/40 |
| 2022/0194440 | A1* | 6/2022 | Akif | B61L 15/0072 |
| 2022/0266879 | A1* | 8/2022 | Kumar | B61C 9/48 |

* cited by examiner

MONITORING SYSTEM FOR AXLES OF A VEHICLE

BACKGROUND

Technical Field

The subject matter described relates to systems and methods that monitor vehicle axles of a vehicle system.

Discussion of Art

A positive vehicle control (PVC) system is a monitoring system that monitors the locations of numerous vehicles in a network of routes and communicates with the vehicles to prevent collisions or other unsafe traveling conditions. PVC systems operate by determining which segments of routes are occupied by vehicles, are undergoing maintenance, or the like, and generates signals that inform the respective vehicles as to whether the vehicles can enter into certain route segments. Without receiving such a signal, the PVC system prevents entry of the respective vehicle from entering a route segment.

Vehicles that utilize PVC systems are often monitored so that if a vehicle breaks down, operates differently than expected, etc. such information can be communicated to the PVC system. The PVC system can then utilize such information to restrict the movement of other vehicles using similar routes. One system that is monitored are the axles of a vehicle. In one example, for rail vehicles, individuals at a station listen for the whistling sound of bearings, and/or look for discoloration of axle boxes or axle grease oozing from the gear box. In another example, once a vehicle is stopped, an individual may touch a gear box to feel if such gear boxes are hot to the touch. Each method is used to determine a hot box, or indication that a hot axle of the vehicle is provided. Once a hot box is detected, such information is passed to the PVC system to adjust other vehicles on the route to accommodate that the vehicle with the hot box will need to undergo maintenance, and will not operate as provided in a previous schedule.

BRIEF DESCRIPTION

In one or more embodiments, a monitoring system is provided that may include a sensor configured to detect at least one characteristic related to at least one axle of a first vehicle. The monitoring system may also include a controller having one or more processors in communication with the sensor. The one or more processors may be configured to restrict movement of the first vehicle based at least in part on the at least one characteristic related to the at least one vehicle axle, and vary movement of a second vehicle based at least in part on the at least one characteristic related to the at least one vehicle axle.

In one or more a method is provided that may include sensing, with a sensor, a characteristic of a first axle of a first vehicle. The method may also include communicating a remedial action to an operator of the first vehicle based on the at least one characteristic related to the at least one axle, and restricting movement of the first vehicle based at least in part on a sensed characteristic of the first axle.

In one or more embodiments, a monitoring system is provided and may include an on-board controller of the first vehicle having one or more processors in communication with an off-board hot box detector. The one or more processors may be configured to receive a detected temperature related to at least one axle of a vehicle from the off-board hot box detector. The one or more processors may also be configured to communicate a remedial action to an operator based on the detected temperature related to the at least one axle of the vehicle.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
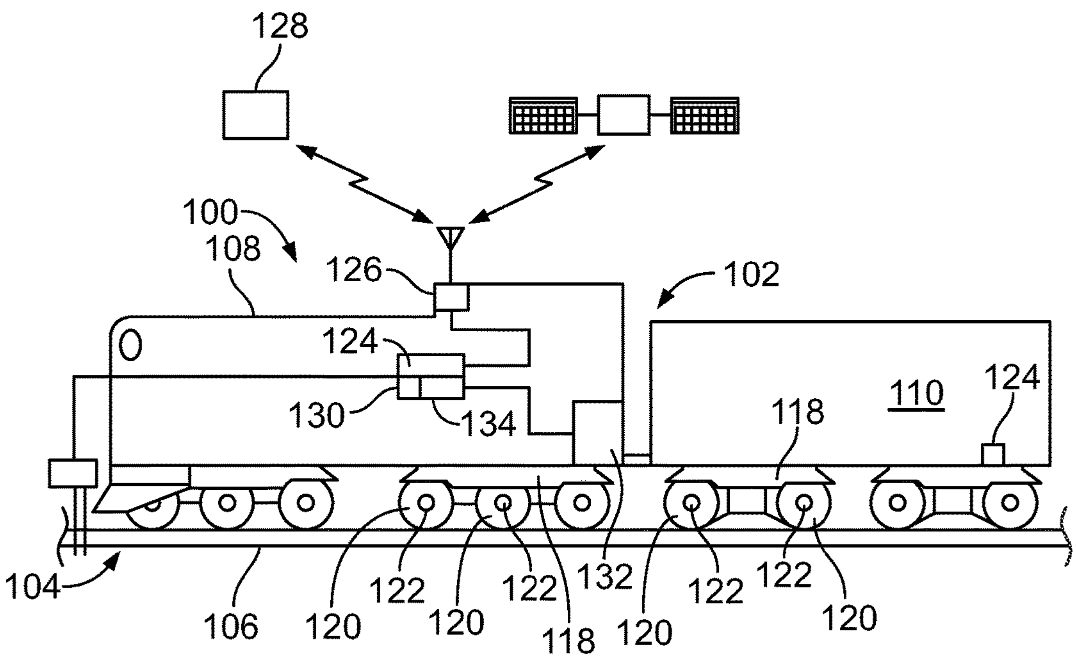
FIG. 1 illustrates a block schematic diagram of a vehicle system.

Embodiments of the subject matter described herein relate to systems and methods that utilize an on-board controller that may be an on-board PVC controller that communicate with an off-board sensor that may be a hot box detector to communicate remedial actions to an operator related to the temperature related to an axle of a vehicle. As such, the on-board controller can positively guide the operator of the vehicle to stop or slow the vehicle. In addition, an off-board controller may also receive such communications so that other vehicles vary their movement to accommodate the restriction of movement of the vehicle. In making the determination of a remedial action, the on-board controller may utilize real time vehicle data from the off-board sensor, vehicle characteristics such as number of axles, wheel data, brake data, total vehicle length, total vehicle weight, historical data related to past vehicle performance, or the like. In one example, the off-board sensor may also be in communication with the off-board controller via the internet of things (IOT) and communicate the temperature related to the axle of the vehicle. In another example, the off-board controller may be a server. The server may also monitor voice communication from the on-board controller and convert audio information related to the temperature related to the axle to digital data to communicate to a second off-board controller remote to the off-board sensor.

A PVC system is a monitoring system utilized by a vehicle system to allow the vehicle system to move within a designated restricted manner (such as above a designated penalty speed limit, to enter another route segment, etc.) only responsive to receipt or continued receipt of one or more signals (e.g., received from off-board the vehicle) that meet designated criteria, e.g., the signals have designated characteristics (e.g., a designated waveform and/or content), are received at designated times (or according to other designated time criteria), and/or under designated conditions. For example, the vehicle may be automatically prevented from entering into another route segment unless a signal is received by the PVC system indicating that the other route segment does not include any other vehicles, may be automatically prevented from moving at speeds above a speed limit when a route segment has a maintenance crew present, etc. This is opposed to 'negative' vehicle monitoring systems where a vehicle is allowed to move unless a signal (restricting movement) is received.

Not all embodiments described herein are limited to rail vehicle systems, or PVC systems. For example, one or more embodiments of the detection systems and methods described herein can be used in connection with other types of vehicles, such as automobiles, trucks, buses, mining vehicles, marine vessels, aircraft, agricultural vehicles, or the like. As another example, one or more embodiments can be used with vehicle control systems other than PVC systems to change movement of a vehicle. For example, a negative vehicle monitoring system could be utilized to change the movement of a vehicle.

FIG. 1 illustrates a schematic diagram of one example of a vehicle system 100 that includes a control system 102. The vehicle system may be configured to travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. Alternatively, the vehicle system may be formed of only a single propulsion-generating vehicle.

The propulsion-generating vehicle may generate tractive efforts to propel (for example, pull or push) the vehicle system along routes. The propulsion-generating vehicle includes a propulsion subsystem, such as an engine, one or more traction motors, and/or the like, that operate to generate tractive effort to propel the vehicle system. The propulsion-generating vehicle also includes a braking system 112 that generates braking effort to slow or stop movement of the vehicle system. Although one propulsion-generating vehicle and one non-propulsion-generating vehicle are shown in FIG. 1, the vehicle system may include multiple propulsion-generating vehicles and/or multiple non-propulsion-generating vehicles. In an alternative embodiment, the vehicle system only includes the propulsion-generating vehicle such that the propulsion-generating vehicle is not coupled to the non-propulsion-generating vehicle or another kind of vehicle. In yet another embodiment, the vehicles in the vehicle system are logically or virtually coupled together, but not mechanically coupled together.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. In one embodiment, the vehicle system may not include axles, such as in some mining vehicles, electric vehicles, etc.

An on-board controller 124 may also be provided that includes a wireless communication system 126 that allows wireless communications between vehicles in the vehicle system and/or with remote locations, such as the remote (e.g., dispatch) location 128. Such remote locations include off-board controllers such as back office controllers and vehicle dispatch controllers. The on-board controller may include a receiver and a transmitter, or a transceiver that performs both receiving and transmitting functions. The on-board controller may also include an antenna and associated circuitry.

The on-board controller further includes a trip characterization element 130. The trip characterization element may be configured to provide information about the trip of the vehicle system along the route. The trip information may include route characteristics, designated locations, designated stopping locations, schedule times, meet-up events, directions along the route, and the like. For example, the designated route characteristics may include grade, elevation slow warnings, environmental conditions (e.g., rain and snow), and curvature information. The trip information concerning schedule times may include departure times and arrival times for the overall trip, times for reaching designated locations, and/or arrival times, break times (e.g., the time that the vehicle system may be stopped), and departure times at various designated stopping locations during the trip.

The trip characterization element may also include vehicle control setting for the trip, including throttle settings, dynamic braking settings, etc. The trip characterization element may be a database stored in an electronic storage device, or memory. The information in the trip characterization element 130 may be input via the user interface device by an operator, may be automatically uploaded, or may be received remotely via the communication system. The source for at least some of the information in the trip characterization element may be a trip manifest, a log, or the like.

In an embodiment, the on-board controller may include a vehicle characterization element 134. The vehicle characterization element may provide information about the make-up of the vehicle system, such as the type of non-propulsion-generating vehicles (for example, the manufacturer, the product number, the materials, etc.), the number of non-propulsion-generating vehicles, the weight of non-propulsion-generating vehicles, whether the non-propulsion-generating vehicles are consistent (meaning relatively identical in weight and distribution throughout the length of the vehicle system) or inconsistent, the type and weight of cargo, the total weight of the vehicle system, the number of propulsion-generating vehicles, the position and arrangement of propulsion-generating vehicles relative to the non-propulsion-generating vehicles, the type of propulsion-generating vehicles (including the manufacturer, the product number, power output capabilities, available notch settings, fuel usage rates, etc.), and the like.

The vehicle characterization element may be a database stored in an electronic storage device, or memory. The information in the vehicle characterization element may be input using an input/output (I/O) device (referred to as a user interface device) by an operator, may be automatically uploaded, or may be received remotely via the communication system. The source for at least some of the information in the vehicle characterization element may be a vehicle manifest, a log, or the like.

The on-board controller may also be in communication with an off-board sensor 136. The off-board sensor may be located adjacent to the route. In one example, the off-board sensor is a hot box detector that detects a temperature related to the axles of the vehicle.

Figure 2:
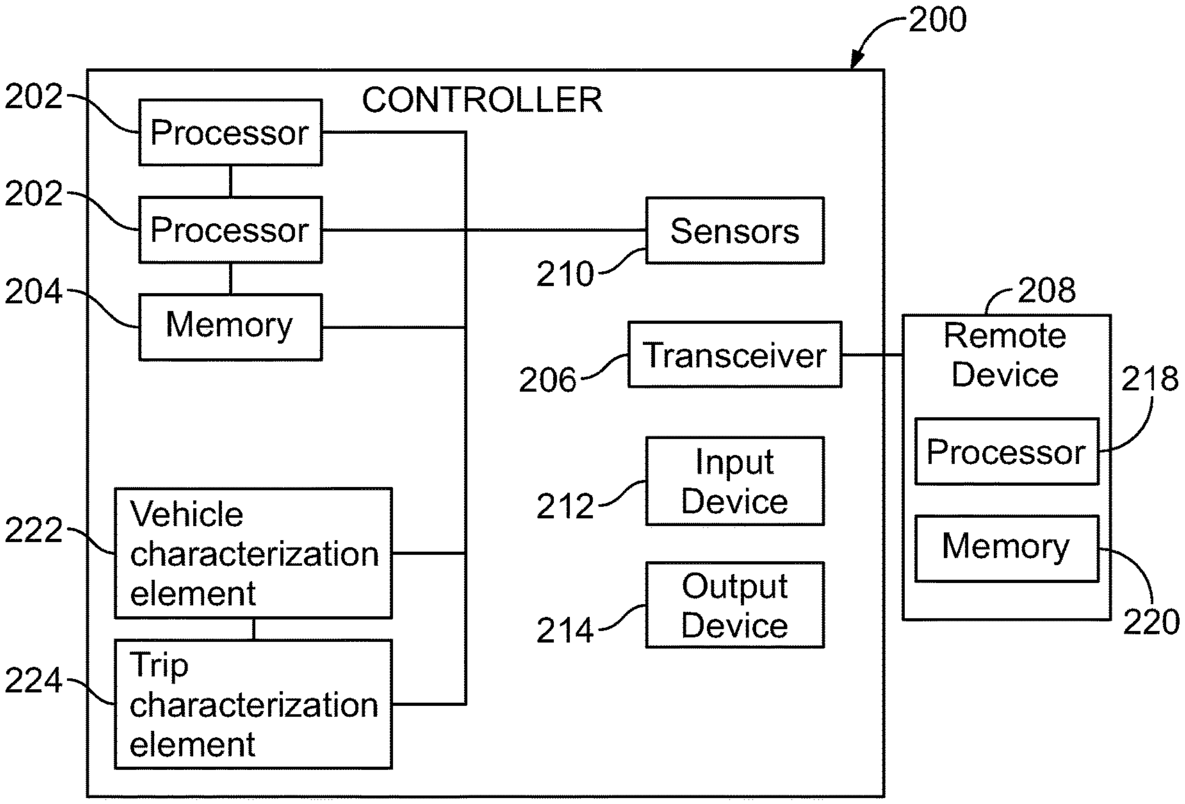
FIG. 2 illustrates block schematic diagram of a controller.

FIG. 2 provides a schematic illustration of an on-board controller 200 that may be configured to control operation of a propulsion-generating vehicle. In one example, the on-board controller represents the on-board controller in FIG. 1.

The on-board controller may be a device that includes one or more processors 202 (microprocessors, integrated circuits, field programmable gate arrays, etc.). The one or more processors may determine characteristics of the vehicle system based on a sensor reading, and/or based on one or more force parameters. Force parameters may represent or be used to determine a force on the vehicle system. Force parameters may include route grade, route curvature, resistive forces, motor tractive forces, dynamic braking, air braking, throttle position, brake pipe pressure drop, or the like.

The on-board controller optionally may also include a controller memory 204, which may be an electronic, computer-readable storage device or medium. The controller memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. The memory may be utilized to store information related to vehicle parameters, route parameters, trip parameters, or the like. Vehicle parameters may include vehicle weight, wheel diameter, tachometer readings, throttle settings, brake settings, speeds, brake settings, accelerations, etc. Route parameters may include route grade, route weather, route curvature, etc. Trip parameters may include destination, speed limits for areas, traffic congestion, break locations, tunnel locations, or the like.

The on-board controller may also include a transceiver 206 configured to communicate with an off-board controller 208. The transceiver may be a single unit or be a separate receiver and transmitter. In one example, the transceiver may only transmit signals. The off-board controller may be server, remote off-board device, back office controller, vehicle dispatch controller, or the like. In one example, the off-board controller is a PVC system as described herein, and more specifically, in one embodiment a positive train control (PTC) system. The PVC system may be configured to receive characteristic information from the transceiver, determine and/or calculate the characteristic of a vehicle, calculate characteristics and parameters of the vehicle, restrict movement of the vehicle and one or more other vehicles based on a set of rules, etc.

The off-board controller in one example may be at a remote location and be a back office controller, a vehicle dispatch controller, a remote server, or the like. The off-board controller may be a first off-board controller that communicates with a second off-board controller. In particular, if the on-board controller or an off-board sensor is unable to communicate with certain off-board controllers because of lack of a connection to the IOT, the on-board controller or off-board sensor may instead communicate with a first off-board controller that is then able to communicate with the second off-board controller through the IOT. In addition, the first off-board controller or off-board sensor, may also monitor voice communication from the on-board controller and convert audio information related to a characteristic of the vehicle, such as the temperature related to the axle, to digital data to communicate to the second off-board controller. In this manner, even if a first off-board controller or off-board sensor does not have IOT capabilities, they can communicate with a first off-board controller, such as a server, that has such capabilities.

The off-board controller may be a PVC that obtains information from the on-board controller, another off-board controller, and/or controllers of other vehicles traveling along one or more routes of the vehicle with the on-board controller. The off-board controller may include one or more processors 218 for making determinations and a memory 220 with historical data related to the vehicle, similar vehicles, the route, the trip the vehicle is undertaking, or the like. In one example, the historical data is historical temperature data. In another example, the off-board controller may make determinations regarding the movement of the vehicle, and communicate such determinations to the on-board controller. In this manner, the off-board controller may restrict movement of the vehicle through communication with the on-board controller, and restrict movement of other vehicles through communication with the on-board controllers of the other vehicles. To this end, the off-board controller may receive data related to a temperature related to an axle and make a health determination. The off-board controller may also communicate with other vehicles traveling on the route of the vehicle such that if a health determination is made that the vehicle has a hot axle, remedial actions of the vehicle and other vehicles can be undertaken. Specifically, if an axle is determined to be unhealthy, needing maintenance, if the vehicle needs to slow, if less torque needs to be placed on an unhealthy axle, etc., the off-board controller can vary the movements of other vehicles on the route of the vehicle accordingly.

The on-board controller may also include one or more sensors 210 coupled to the vehicle system to detect vehicle parameters, route parameters, trip parameters, or the like. The sensors may be coupled to the vehicle system, adjacent a vehicle system, off-board sensors, or otherwise. For example, a weather sensor that is in communication with the one or more processors, even when in a remote location, may be considered a sensor of the controller.

In one example the sensor may be an off-board hot box detector. The off-board hot box detector may be positioned adjacent a route to determine a temperature related to an axle of the vehicle. The off-board hot box detector may be an infrared sensor, temperature sensor, or the like. The off-board hot box detector may detect the temperature of a gear casing of an axle, the bearing temperature of an axle, a fluid temperature of lubricant of the axle, or the like. When used herein, the phrase "temperature of an axle" or "temperature of the axle" may include any of these types of temperature detections or determinations that are temperatures related to the axle.

The detected temperature may be utilized to determine the health of the axles. In one example, the health of the axle may be determined by comparing the temperature of one axle bearing to other axle bearings of the vehicle. In another example, the health may be determined by comparing the determined temperature of the axle bearings to historical temperature data of similar temperatures of other axle bearings. In yet another example, the health of the axle may be determined by comparing a previous axle temperature determination to a current axle temperature determination. Such health may be determined utilizing an algorithm, mathematical model, mathematical function, lookup table, decision tree, or the like.

The on-board controller may also include an input device 212 and an output device 214. Specifically, the input device may be an interface between an operator and the one or more processors. The input device may include a display or touch screen, input buttons, ports for receiving memory devices, etc. In this manner, an operator may manually provide parameters into the controller, including vehicle parameters, route parameters, and trip parameters.

The output device may present information and data to an operator, or provide prompts for information and data. The output device may similarly be a display or touch screen. In this manner, a display or touch screen may be an input device and an output device. In one example, the on-board controller may communicate one or more remedial actions to the operator related to a temperature related to the axles sensed by an off-board hot box detector. Such remedial actions may include a reduction of speed of the vehicle, stopping the vehicle, scheduling maintenance, contacting a remote location or off-board controller, or the like. In one example, plural remedial actions may be communicated. In another example, the on-board controller may automatically undertake remedial actions such as slowing the vehicle, stopping the vehicle, scheduling maintenance, etc. and communicate to the operator that the remedial action is being undertaken and/or provide information regarding why the remedial action is being undertaken.

Figure 3A:
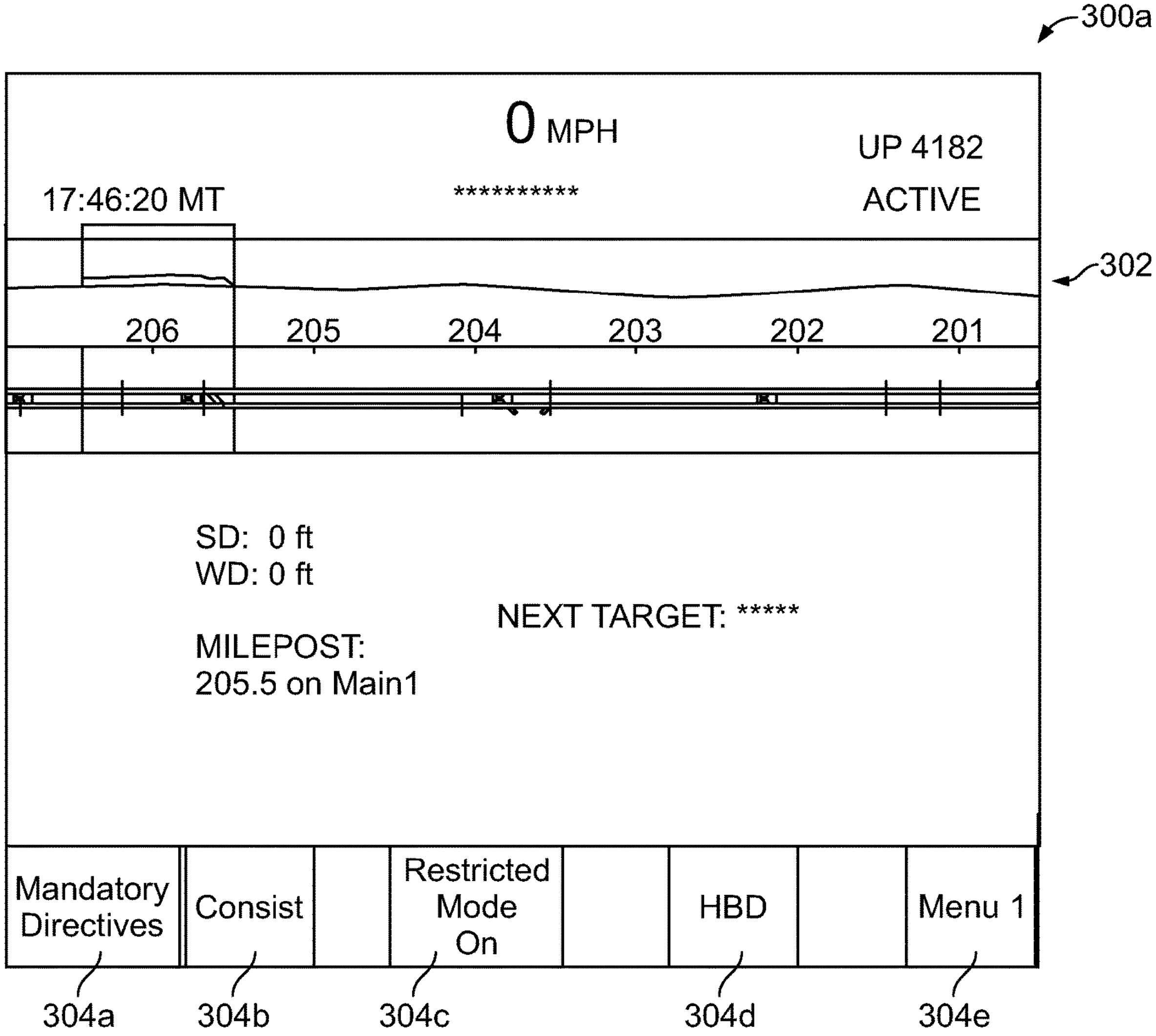
FIG. 3A illustrates a screen shot of an output device of a controller.

FIGS. 3A-3E illustrate example screen shots of an output device. In particular, FIG. 3A illustrates an output screen 300A that includes information indicia 302 related to a vehicle, and tabs 304A-E for different applications that may be provided by the controller. In this example, a HBD tab 304D is provided that presents to an operator that the controller is in communication with a hot box detector that is off-board the vehicle.

Figure 3B:
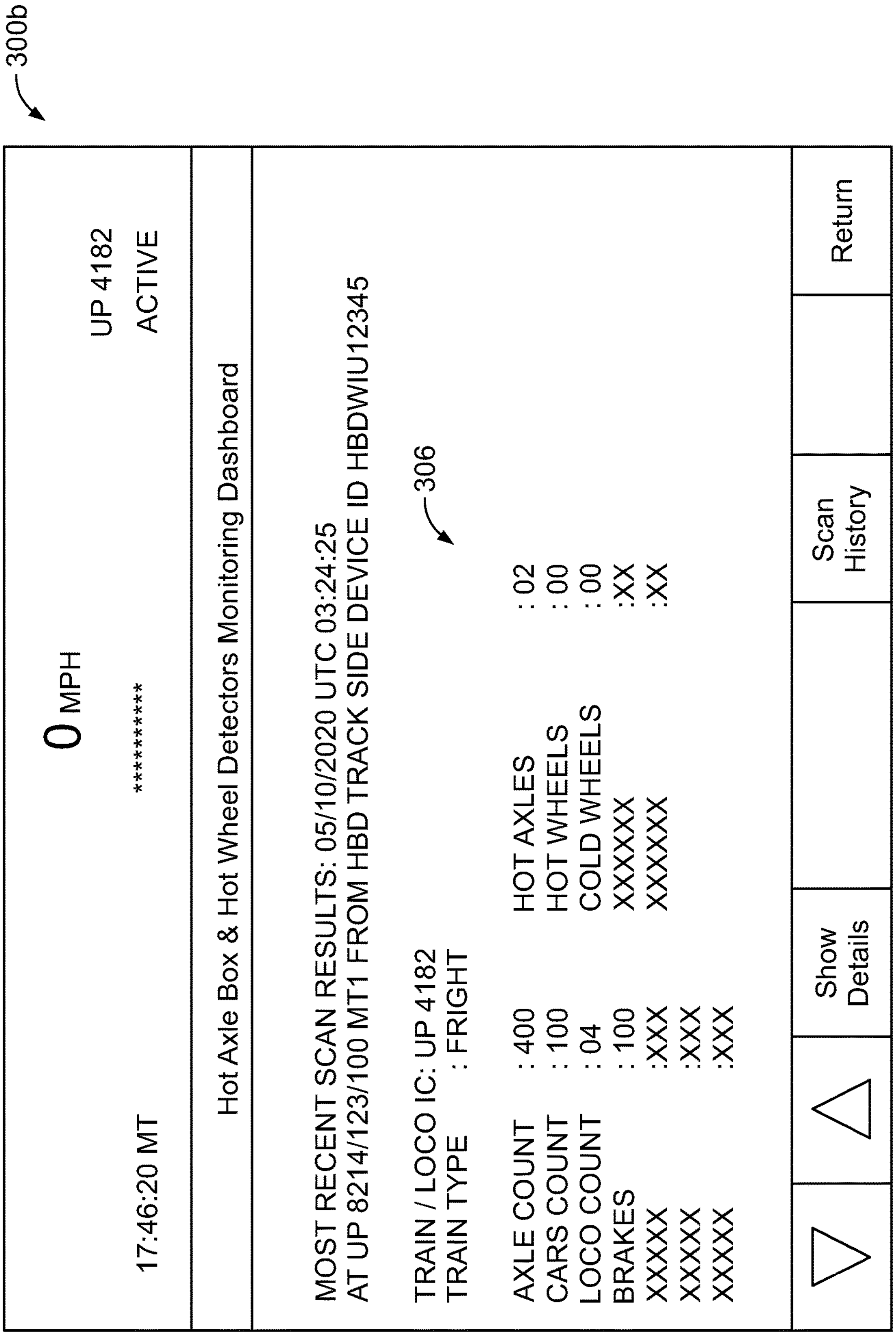
FIG. 3B illustrates a screen shot of an output device of a controller.

FIG. 3B illustrates the screen after actuation of the HBD tab. The HBD tab may be actuated through touching, mouse, manual input into an input device such as a keyboard, or the like. On this screen 300B, axle based indicia 306 is presented. As illustrated, the off-board hot box detector communicates that four hundred (400) axles where counted and two (2) where determined to be hot axles. Information about the vehicle and timing is also provided. By communicating this information to an operator, the operator can determine if maintenance may be needed at a next stop, or if remedial actions should be undertaken.

Figure 3C:
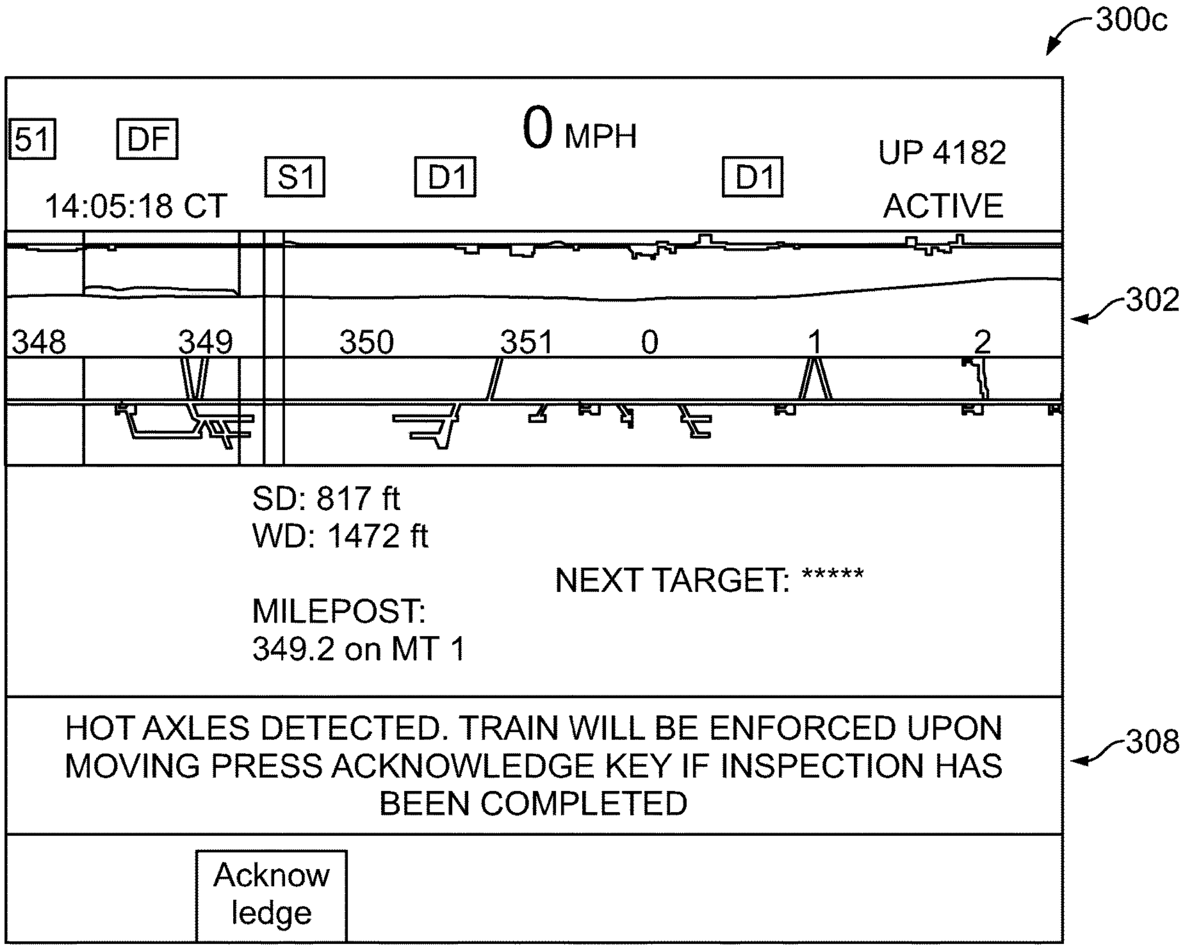
FIG. 3C illustrates a screen shot of an output device of a controller.

FIG. 3C illustrates another example screen 300C where, as a result of the detected hot axles, prompting indicia 308 is provided. In this example, the vehicle has come to a stop, so the operator is informed inspection must occur before the vehicle can exit the stopped condition. As can be seen, the controller may either provide a warning, or even prevent the vehicle from operating until inspection of a detected hot axle has occurred. This prevents an operator from ignoring a hot axle, potentially causing damage and delays for the vehicle.

Figure 3D:
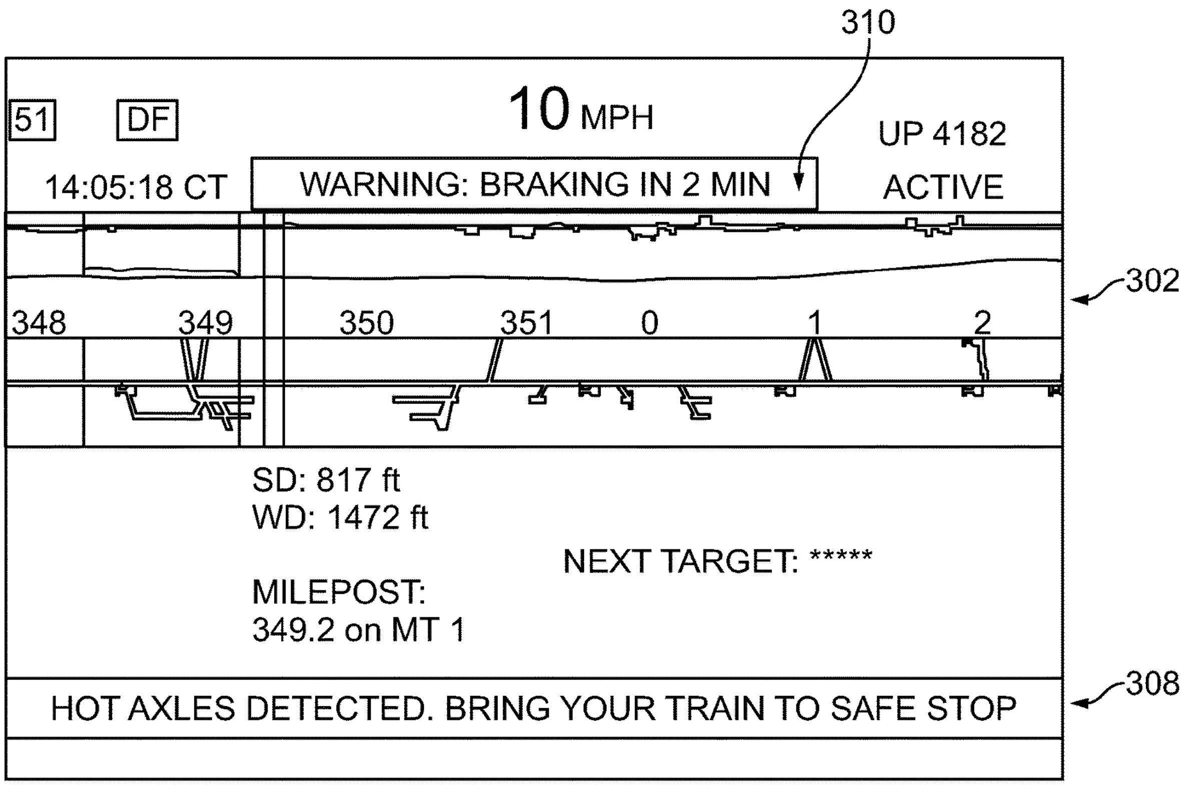
FIG. 3D illustrates a screen shot of an output device of a controller.

FIG. 3D illustrates another screen 300D with prompting indicia. In this example the vehicle is operating when the hot axle is detected by the hot box detector. Here, the prompting indicia indicates that the vehicle must come to a stop as a result of the detected hot axle. This embodiment also includes supplemental warning indicia 310 that braking will occur in two (2) minutes. Here, the controller provides the operator with the opportunity to brake the vehicle; however, if the operator is not available, does not see the prompting indicia, or has a desire to ignore the prompting indicia, the controller may brake the vehicle without input from the operator. By providing the warning indicia, information is provided to the operator that this is information that should not be ignored, increasing the likelihood of faster action by the operator.

Figure 3E:
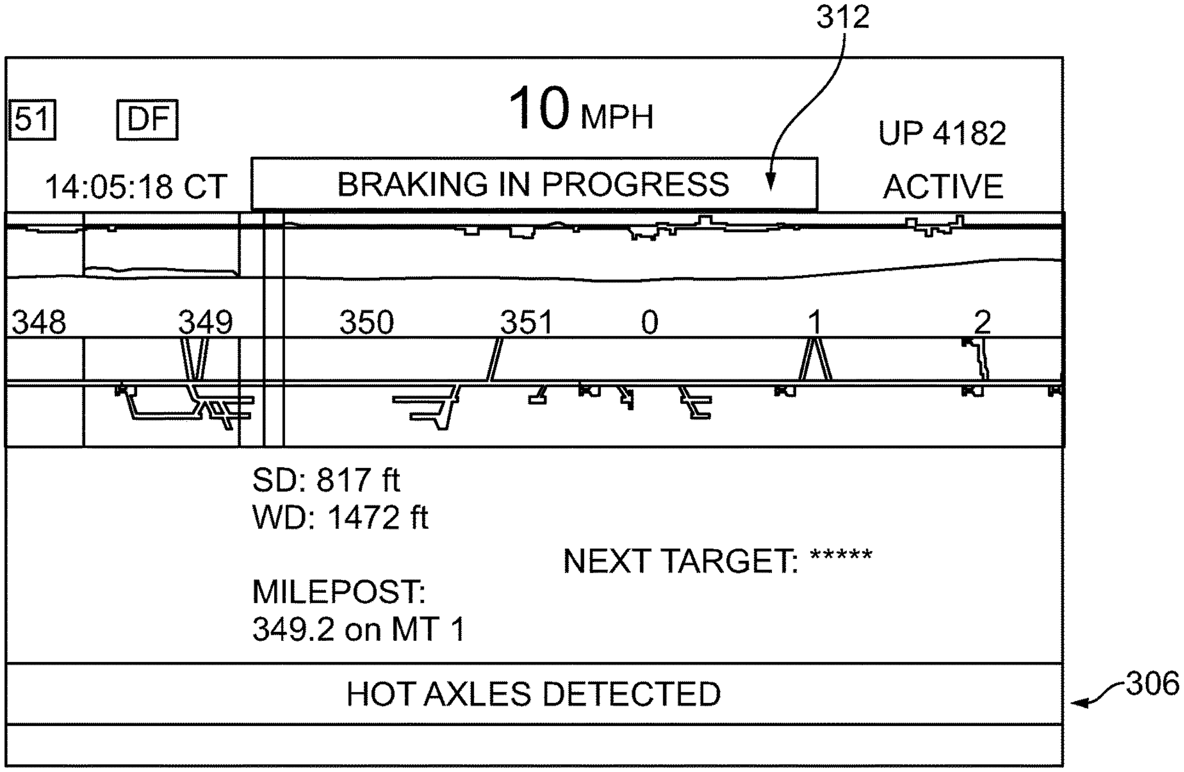
FIG. 3E illustrates a screen shot of an output device of a controller.

Meanwhile FIG. 3E illustrates a screen 300E where the controller determines to take a remedial action. Axle based indicia that hot axles are detected is provided along with remedial action indicia 312. Here, the controller brakes the vehicle, and as a result, the remedial action indicia indicates that braking is in progress accordingly. Again, in this manner, information is provided to the operator so they can understand why the actions of the controller are occurring. While the figures are presented in black and white, the indicia, bars that contain the different indicia, etc. may be different colors, fonts, sizes, flash, or the like to provide differing degrees of emphasis to an operator regarding the information being provided.

With reference back to FIG. 2, the on-board controller may also include the vehicle characterization element 222 and trip characterization element 224 as described in relation to FIG. 1. Each obtains and provides additional characteristics that may by utilized in making determinations, calculations, models, etc. related to the characteristics of the vehicle, the temperature related to the axles, the health of the axles or vehicle, or the like.

Figure 4:
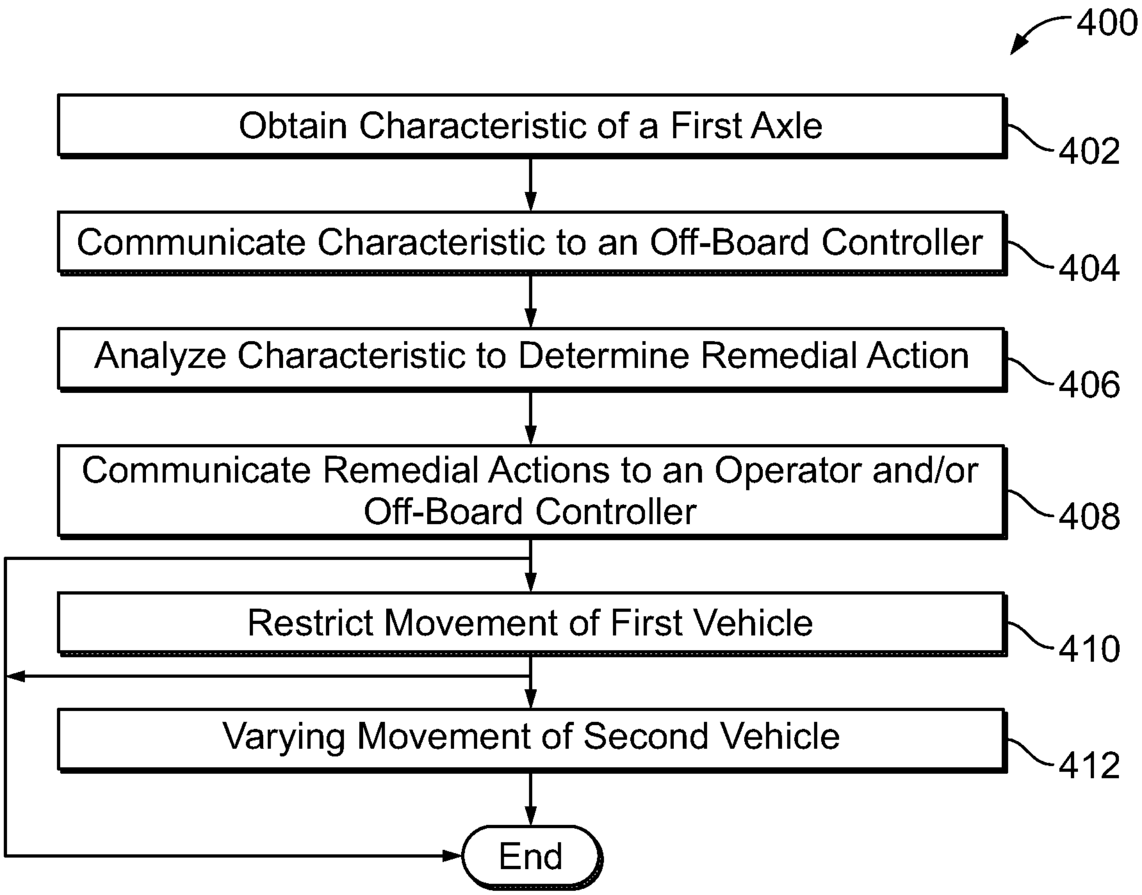
FIG. 4 illustrates a block schematic diagram of a method of restricting the movement of a vehicle system.

FIG. 4 illustrates a block diagram of a method 400 of restricting the movement of a vehicle system. In one example, the on-board controller, off-board controller, and/or sensor of FIG. 2 are utilized to implement the method.

At 402, the on-board controller obtains a characteristic of a first axle of a first vehicle. In one example, the characteristic of the first axle is related to the temperature of the bearings of the first axle. The characteristic may be a detected temperature of the bearings of the first axle, a detected temperature of the first axle, a detected temperature of the gear case housing the first axle, a detected vibration of the first axle, a detected vibration of the gear case, a detected lubricant temperature in the gear case, a detected lubricant level in the gear case, a detected rotational speed of the axle, etc. In particular, each characteristic either provides the temperature of bearings of the first axle, or may be utilized to calculate or determine the temperature of the bearings of the first axle. Such determinations include use of a mathematical equation, mathematical model, algorithm, function, or the like to make a determination related to the temperature of the bearings of the first axle. The characteristic may be obtained by being detected by a sensor, including temperature sensors, infrared sensors, vibration sensors, rotational speed sensors, pressure sensors, fluid level sensors, fluid temperature sensors, etc. In one example, the detected temperature is received from an off-board hot box detector.

The first vehicle may be an automobile, off-road vehicle, mining vehicle, rail vehicle, watercraft, aircraft, etc. The vehicle may be a first vehicle in a multi-vehicle vehicle system. Similarly, the first axle may be a first axle of a multi-axle vehicle, or multi-axle vehicle system. In this manner, the first axle may be on a first vehicle, while a second axle is also on the first vehicle. Alternatively, the first axle may be on the first vehicle, while the second axle is on a second vehicle where the first vehicle and second vehicle are in the same vehicle system.

At 404, the characteristic obtained may be communicated to an off-board controller. In one example, the on-board controller communicates the characteristic to the off-board controller. In another example, an off-board sensor communicates the characteristic to the off-board controller. In particular, while in example embodiments an on-board controller may make determinations, analysis, or the like, in other embodiments, an off-board controller makes the determinations, analysis, or the like. The off-board controller may be a PVC, depot controller, back office controller, or the like. The off-board controller may include a memory with historical data, algorithms, mathematical functions, or models, etc. that use the characteristic to make determinations accordingly. To this end, the off-board controller may make determinations related to a temperature related to an axle, regarding remedial actions in response to the health of a vehicle component such as an axle not being healthy, regarding movements of numerous vehicles along a route, or the like. In particular, while an on-board controller can make such determinations and communicate them to the off-board controller, or other on-board controllers of other vehicles, the off-board controller can also make the determination and communicate them to on-board controllers of numerous vehicles.

At 406, the characteristic is analyzed to determine a remedial action. In particular, if based on the characteristic a component of the vehicle meets a determined condition, remedial actions may be determined to communicate to an operator, and/or to undertake. For example, if the characteristic indicates that the temperature of the axle bearings, axle, lubrication fluid, gear case, etc. is above a threshold temperature, then an indication of a hot axle is presented. A hot axle may result in a locked axle if not addressed. Based on exceeding the threshold temperature, remedial actions are determined. For example, if the expected temperature of an axle bearing is sixty degrees (60°) Celsius (C.), the threshold temperature may be five degrees (5°) C. If the temperature is determined to be greater than sixty degrees (65°) C., then a remedial action may be providing maintenance at the next, unscheduled stop. Alternatively, the next scheduled stop may not have maintenance capabilities, and as a result, the next scheduled stop is skipped in favor of the next available stop having maintenance capabilities.

In an alternative embodiment, there may be multiple threshold temperatures and corresponding remedial actions. For example, in the previous example, when the temperature is more than a first threshold temperature, but less than a second threshold temperature, maintenance at the next stop may be provided. However, if the temperature is above the second threshold temperature, the speed of the vehicle may be reduced. Similarly, above a third threshold temperature, the vehicle may be stopped. So in the provided example, when the temperature of axle bearings is determined to be at a first threshold temperature of 65° C., but below a second threshold temperature of seventy degrees (70°) C. maintenance is scheduled at the next viable stop. However, if the temperature of the axle bearing is determined to be at the second threshold temperature of 70° C., but below a third threshold temperature of seventy-five (75°) C., the control system may reduce the speed of the vehicle, or reduce the torque to the axle in question, in addition to scheduling maintenance. In the example, if the temperature of the axle bearing exceeds the third threshold temperature of 75° C., the control system may immediately stop the vehicle. Thus, based on the severity of the potential problem detected, a determination is made regarding the remedial action.

While in one example, the threshold temperature may simply be determined prior to a trip, alternatively, the threshold temperature may be a dynamic threshold temperature dependent on operating conditions and force parameters of the vehicle. In one example, ambient characteristics are obtained, including the ambient temperature. The threshold temperature may then be determined based on the ambient temperature. In this manner, when the ambient temperature is zero degrees (0°) C., the first threshold temperature may be 60° C., whereas when the ambient temperature is twenty degrees (20°) C., the first threshold temperature may be 65° C. In this manner, the threshold temperature may change based on ambient conditions.

In another embodiment, the analysis may include comparing a temperature of the first axle to the temperature of a second axle to determine whether a threshold temperature difference is provided. In particular, the threshold temperature may be based on other axles in a vehicle or vehicle system. If a sensed temperature related to a first axle is greater than a threshold temperature of 5° C. compared to a second axle, remedial action may be undertaken. In particular, axles of the same vehicle should be operating at approximately the same temperature. Thus, a differentiation between a first axle and a second axle may be an indication of a malfunctioning axle. In one example, the temperature differentiation results in the remedial action. In another example, a third axle is sensed to verify the determination. Specifically, if the second axle is 5° C. above the first axle, and a third axle, verification is provided that the second axle may be malfunctioning and need maintenance. Alternatively, if the third axle is also 5° C. above the temperature of the first axle, an indication of a faulty determination of the temperature of the first axle may be presented resulting in only a check at a next stop instead of a scheduled maintenance.

In another example, the analysis includes comparing the temperature of the first axle sensed by the sensor to the temperature of the first axle obtained from the previous trip. In this example, when a vehicle takes a similar route numerous times, the temperature related to the first axle during a first trip may be compared to the temperature of the first axle during a second trip. Such a comparison can detect degradation of the first axle, including the bearings of the first axle over time. To this end, the temperature of the first axle may be compared to the temperature of the first axle over numerous trips such that a rate of degradation can be determined. Based on the rate of degradation, remedial actions such as an alert or other communication may be provided to the operator, an off-board controller remote to the vehicle, etc. may be provided. To this end, the off-board controller can then schedule replacement vehicles, maintenance time, etc. that least disturbs the overall operations of vehicles on a route. Additionally, in one example, the temperature of the axle may be historical temperature data within a memory of the on-board controller. Alternatively, the temperature of the axle may be historical temperature data within a memory of an off-board controller. In yet another embodiment, the historical temperature data within a memory of the off-board controller is the temperature related to an axle of a vehicle with a similar make, model, or characteristics of the vehicle. Similarly, the historical temperature data may include testing data of a particular bearing system utilized by the vehicle.

At 408, remedial actions are communicated to an operator, and/or an off-board controller. In particular, based on the analysis, if a remedial action or actions are needed, they are communicated to the operator. Such communication may include an alert, auditory alert, voice command, visual alert, blinking lights, indicia on an output device, color presented on an output device, etc. The remedial actions can include any remedial actions discussed in detail herein.

At 410, optionally, the movement of the first vehicle is restricted based at least in part on a sensed characteristic of the first axle. Restricting movement may include slowing down a vehicle, stopping a vehicle, reducing input or torque to a first axle, reducing input or torque to a first axle while increase input or torque to one or more other axles, stopping input or torque to a first axle while increasing input or torque to one or more other axles, scheduling an unplanned stop, scheduling maintenance at a planned stop, scheduling maintenance, etc. In each instance, the determined schedule of a vehicle is varied based on the sensed characteristic of the first axle.

At 412, optionally, varying the movement of a second vehicle based at least in part on the sensed characteristic of the first axle. Again, the movement of the second vehicle may be restricted in any of the way described in relation to operation 410. In one example, the first vehicle and second vehicle are part of the same vehicle system, and when the input and torque provided to a first axle of a first vehicle is reduced, the input and torque provided to a second axle of the second vehicle is increased such that the vehicle system does not vary in speed. In an alterative embodiment, the first vehicle is from a first vehicle system and the second vehicle is from a different, second vehicle system. In one example, the second vehicle system is on the same route as the first vehicle system. When the first vehicle system slows to mitigate a faulty component such as an axle, the second vehicle system is also slowed to prevent a collision of the first vehicle system and second vehicle system. In another example, the first vehicle system again is slowed; however, in this example, the second vehicle system increases in speed to merge onto the route of the first vehicle system before the first vehicle system makes it to the merge point. In another example, the first vehicle system is scheduled for maintenance at a next stop at the same time the second vehicle system was to have maintenance provided. As a result, an on-board or off-board controller finds an available maintenance slot open at a different stop and reschedules the maintenance of the second vehicle system accordingly. Again, movement is varied by reducing speed or torque, increasing speed or torque, scheduling a stop, rescheduling a stop, or the like. In this manner, a faulty component of a first vehicle or first vehicle system does not result in delays for a second vehicle or vehicle system, improving efficiencies.

In one or more embodiments, a monitoring system is provided that may include a sensor configured to detect at least one characteristic related to at least one axle of a first vehicle. The monitoring system may also include a controller having one or more processors in communication with the sensor. The one or more processors may be configured to restrict movement of the first vehicle based at least in part on the at least one characteristic related to the at least one vehicle axle, and vary movement of a second vehicle based at least in part on the at least one characteristic related to the at least one vehicle axle.

Optionally, the sensor may at least be one of an infrared sensor, hot box detector, temperature sensor, vibration sensor, or motion sensor. In one aspect, the at least one characteristic related to the at least one axle may be a temperature of a bearing of the axle. In another aspect, the sensor may be an off-board sensor adjacent a route traversed by the vehicle. In one example, the controller may be an off-board controller. Alternatively, the controller may be and on-board controller. In one aspect, the on-board controller may be also configured to communicate at least one remedial action to an operator of the first vehicle based on the at least one characteristic related to the at least one axle, and communicate with an off-board controller at a remote location based on the at least one characteristic related to the at least one axle. In one embodiment, the first vehicle may be part of a first vehicle system, and the second vehicle may be part of a different, second vehicle system.

In one or more embodiment, a method is provided that may include sensing, with a sensor, a characteristic of a first axle of a first vehicle. The method may also include communicating a remedial action to an operator of the first vehicle based on the at least one characteristic related to the at least one axle, and restricting movement of the first vehicle based at least in part on a sensed characteristic of the first axle.

Optionally, the remedial action may be at least one of reducing a speed of the first vehicle, stopping the first vehicle, or scheduling maintenance for the first vehicle. In one aspect, the characteristic of the first axle of the first vehicle may be a temperature related to the first axle.

Optionally, the method may also include determining whether the temperature related to the first axle is above a threshold temperature, and restricting the movement of the first vehicle based on determining the temperature related to the first axle is above the threshold temperature. In one aspect, the method may also include sensing, with the sensor, a temperature related to a second axle of the first vehicle, comparing the temperature related to the first axle to the temperature related to the second axle to determine whether a threshold difference is provided, and restricting the movement of the first vehicle when the difference is provided. Alternatively, the method may include obtaining a temperature related to the first axle during a previous trip, comparing the temperature related to the first axle sensed by the sensor to the temperature related to the first axle obtained from the previous trip, and restricting the movement of the first vehicle based on the temperature of the first axle obtained from the previous trip. In another aspect, the method may also include obtaining an ambient temperature of an environment of the vehicle, determining a threshold temperature based on the ambient temperature, determining whether the temperature related to the first axle is above a threshold temperature, and restricting the movement of the first vehicle based on determining the temperature of the first axle is above the threshold temperature. In one example, the method may also include communicating the characteristic of the first axle of the first vehicle to an off-board controller at a remote location, determining, with the off-board controller, to vary movement of a second vehicle based at least in part on the sensed characteristic of the first axle communicated.

In one or more embodiments, a monitoring system is provided and may include an on-board controller of the first vehicle having one or more processors in communication with an off-board hot box detector. The one or more processors may be configured to receive a detected temperature related to at least one axle of a vehicle from the off-board hot box detector. The one or more processors may also be configured to communicate a remedial action to an operator based on the detected temperature related to the at least one axle of the vehicle.

Optionally, the detected temperature related to the at least one axle may be a temperature of an axle bearing of the at least one axle. In one aspect, the remedial action may be at least one of reducing the speed of the first vehicle, stopping the first vehicle, or scheduling maintenance for the first vehicle. In another aspect, the on-board controller may also be configured to restrict the movement of the vehicle based on the detected temperature related to the at least one axle of the vehicle.

As used herein, the terms “processor” and “computer,” and related terms, e.g., “processing device,” “computing device,” and “controller” may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term “non-transitory computer-readable media” represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as “about,” “substantially,” and “approximately,” may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:

sensing, with a sensor, at least one characteristic related to at least a first axle of a first vehicle of a vehicle system;

communicating the at least one characteristic of at least the first axle of the first vehicle to an on-board controller via the internet of things (IOT);

communicating a remedial action to an operator of the first vehicle based on the at least one characteristic related to the at first axle of the first vehicle;

restricting movement of the first vehicle based at least in part on the at least one characteristic of at least the first axle of the first vehicle communicating the at least one characteristic of at least the first axle of the first vehicle to an off-board controller at a remote location via the IOT; and determining, with the off-board controller, to reduce a first torque to the first axle of the first vehicle and increase a second torque to a second axle of a second vehicle of the vehicle system based at least in part on the at least one characteristic of at least the first axle communicated, such that the vehicle system does not vary in speed.

2. The method of claim 1, wherein the remedial action is at least one of reducing a speed of the first vehicle, stopping the first vehicle, or scheduling maintenance for the first vehicle.

3. The method of claim 1, wherein the at least one characteristic of at least the first axle of the first vehicle is a temperature related to the first axle.

4. The method of claim 3, further comprising:

determining whether the temperature related to at least the first axle is above a threshold temperature; and restricting the movement of the first vehicle based on determining the temperature related to at least the first axle is above the threshold temperature.

5. The method of claim 3, further comprising:

sensing, with the sensor, a temperature related to a second axle of the first vehicle;

comparing the temperature related to at least the first axle to the temperature related to the second axle to determine whether a threshold difference is provided; and restricting the movement of the first vehicle when the difference is provided.

6. The method of claim 3, further comprising:

obtaining a temperature related to at least the first axle during a previous trip;

comparing the temperature related to at least the first axle sensed by the sensor to the temperature related to at least the first axle obtained from the previous trip; and restricting the movement of the first vehicle based on the temperatue of at least the first axle obtained from the previous trip.

7. The method of claim 3, further comprising:

obtaining an ambient temperature of an environment of the first vehicle, determining a threshold temperature based on the ambient temperature;

determining whether the temperature related to at least the first axle is above a threshold temperature; and restricting the movement of the first vehicle based on determining the temperature of at least the first axle is above the threshold temperature.

* * * * *